United States Patent
Beglau

(10) Patent No.: US 6,863,200 B2
(45) Date of Patent: Mar. 8, 2005

(54) CUP HOLDER ASSEMBLY

(75) Inventor: Michael R. Beglau, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 10/322,019

(22) Filed: Dec. 17, 2002

(65) Prior Publication Data

US 2004/0112930 A1 Jun. 17, 2004

(51) Int. Cl.$^7$ ................................................ B60N 3/10
(52) U.S. Cl. ................................ 224/482; 224/926
(58) Field of Search .......................... 224/926, 482, 224/281, 539, 540, 543, 549, 552, 554; 248/311.2; 296/37.1, 37.8, 37.13

(56) References Cited

U.S. PATENT DOCUMENTS

| | | | |
|---|---|---|---|
| 4,379,541 A | * | 4/1983 | Harkness ................... 248/544 |
| 4,530,480 A | * | 7/1985 | Pratt ........................ 248/311.2 |
| 4,728,018 A | | 3/1988 | Parker |
| 5,219,140 A | | 6/1993 | Spykerman |
| 5,279,489 A | | 1/1994 | Wheelock et al. |
| 5,474,272 A | * | 12/1995 | Thompson et al. ...... 248/311.2 |
| 5,829,726 A | * | 11/1998 | Withun ........................ 224/926 |
| 5,833,194 A | * | 11/1998 | Jones et al. ................. 224/926 |
| 5,897,089 A | | 4/1999 | Lancaster et al. |
| 6,076,793 A | | 6/2000 | Yamamoto |

FOREIGN PATENT DOCUMENTS

| | | |
|---|---|---|
| EP | 1 033 282 A2 | 1/2000 |
| GB | 2 326 141 A | 5/1998 |
| GB | 2 331 737 A | 11/1998 |

\* cited by examiner

Primary Examiner—Nathan J. Newhouse
(74) Attorney, Agent, or Firm—Bill Panagos; Bliss McGlynn, P.C.

(57) ABSTRACT

A cup holder assembly for a vehicle includes a cup holder having longitudinal ends. The cup holder assembly also includes a plurality of trammels operatively supported by interior structure of the vehicle and spaced longitudinally from each other for cooperating with the longitudinal ends. Each of the trammels has a bearing track to allow each of the longitudinal ends to be adjusted longitudinally to adjust a size of an opening formed between the cup holder and the interior structure to hold a container therein.

21 Claims, 2 Drawing Sheets

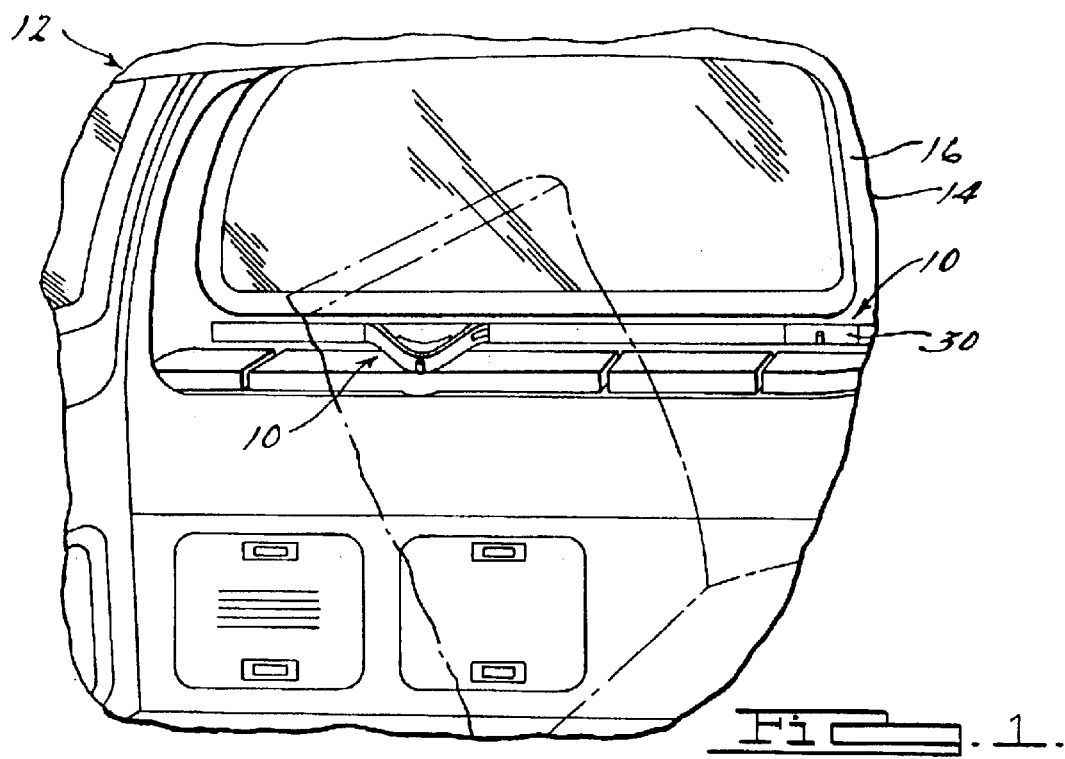
Fig. 1.
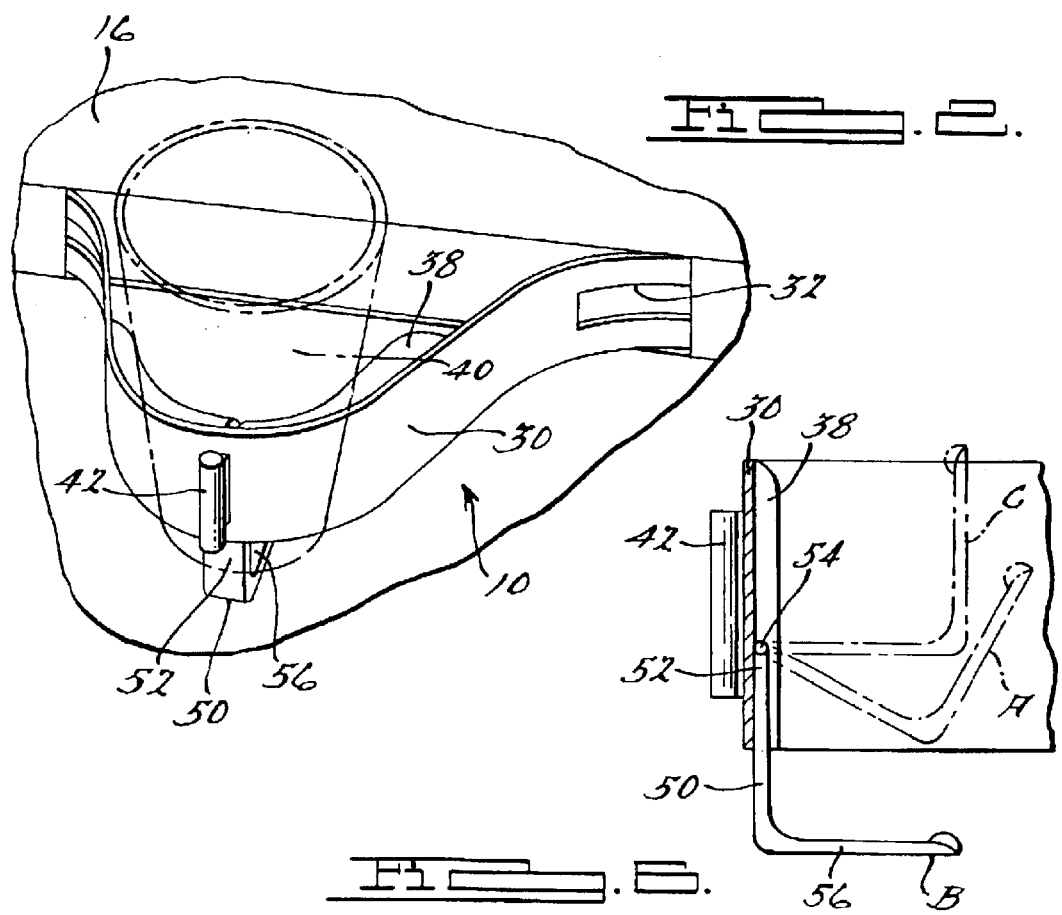
Fig. 2.
Fig. 3.

CUP HOLDER ASSEMBLY

BACKGROUND OF THE INVENTION

1. Field of the Invention

The present invention relates generally to cup holders for vehicles and, more particularly, to a cup holder assembly for a vehicle.

2. Description of the Related Art

It is known to provide a cup holder for a vehicle. An example of such a cup holder is disclosed in U.S. Pat. No. 6,105,917 to Yabuya et al. In this patent, a cup holder is arranged for withdrawal from and insertion into an accommodation case. The cup holder includes a frame plate, a cup insertion hole formed through the frame plate, and a cup receiving frame pivotally arranged on the frame plate for rotation and receiving a cup at a location underneath the cup insertion hole.

However, it is desirable to provide a new cup holder assembly for a vehicle. It is also desirable to provide a cup holder assembly, which is adjustable to accommodate various sized cups or containers. It is further desirable to provide a cup holder assembly that is supported by an interior side of a vehicle. Therefore, there is a need in the art to provide a cup holder assembly for a vehicle that meets these desires.

SUMMARY OF THE INVENTION

It is, therefore, one object of the present invention to provide a new cup holder assembly for a vehicle.

It is another object of the present invention to provide a cup holder assembly for a vehicle that adjusts to accommodate various sizes of cups or containers.

It is a further object of the present invention to provide a cup holder assembly that is supported by an interior side of a vehicle.

To achieve the foregoing objects, the present invention is a cup holder assembly for a vehicle including a cup holder having longitudinal ends. The cup holder assembly also includes a plurality of trammels operatively supported by interior structure of the vehicle and spaced longitudinally from each other for cooperating with the longitudinal ends. Each of the trammels has a bearing track to allow each of the longitudinal ends to be adjusted longitudinally to adjust a size of an opening formed between the cup holder and the interior structure to hold a container therein.

One advantage of the present invention is that a new cup holder assembly is provided for a vehicle. Another advantage of the present invention is that the cup holder assembly is adjustable to accommodate various sizes of cups or containers. Yet another advantage of the present invention is that the cup holder assembly is supported by an interior side of a vehicle. Still another advantage of the present invention is that the cup holder assembly has a cup support that is automatically stowable at a closing position, thereby avoiding a finger pinch condition.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a cup holder assembly, according to the present invention, illustrated in operational relationship with a vehicle.

FIG. 2 is an enlarged perspective view of the cup holder assembly of FIG. 1.

FIG. 6 is a fragmentary elevational view of a portion of the cup holder assembly of FIG. 1.

DESCRIPTION OF THE PREFERRED EMBODIMENT

Figure 3:
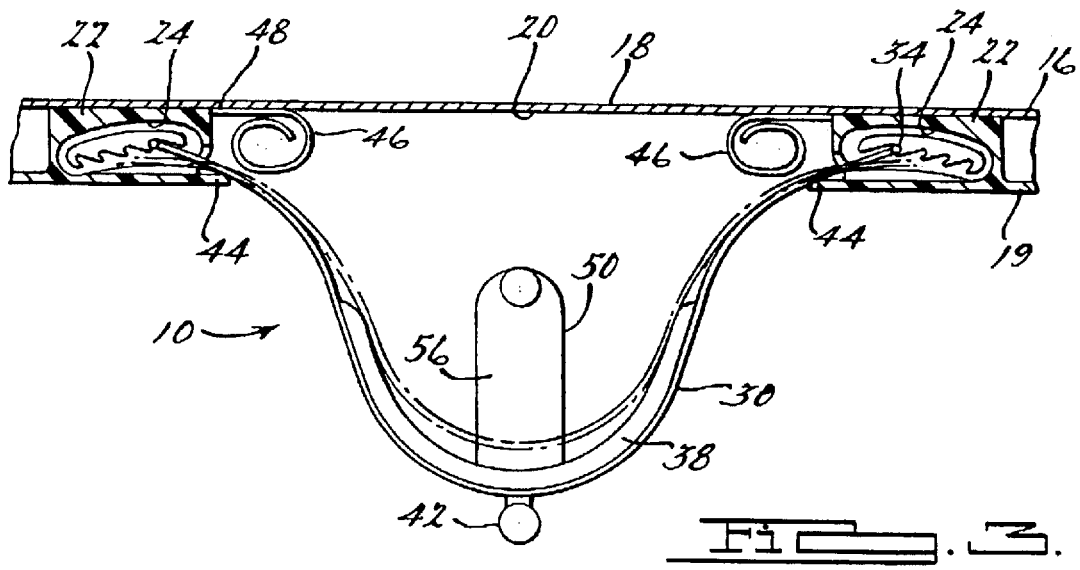
FIG. 3 is a fragmentary plan view of the cup holder assembly of FIG. 1.
Figure 4:
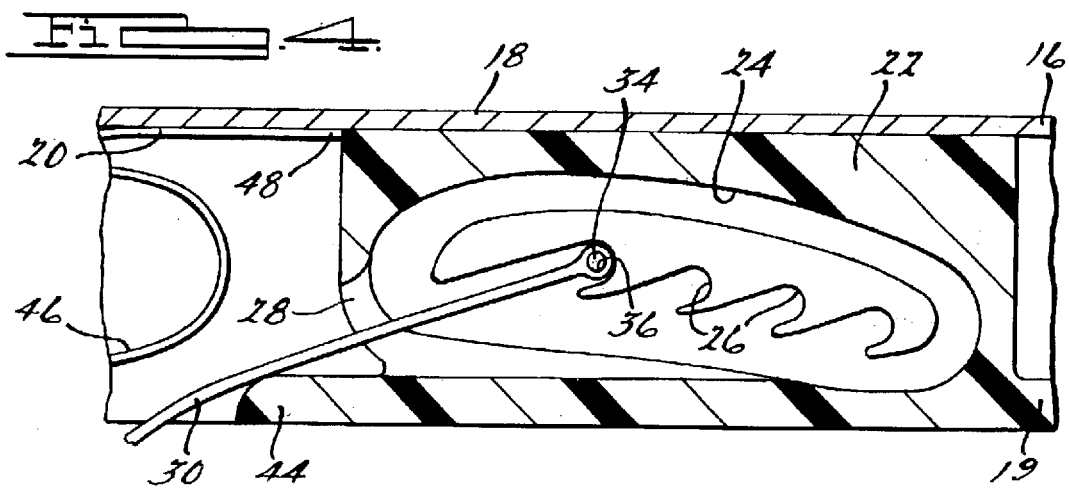
FIG. 4 is an enlarged fragmentary plan view of a portion of the cup holder assembly of FIG. 1.
Figure 5:
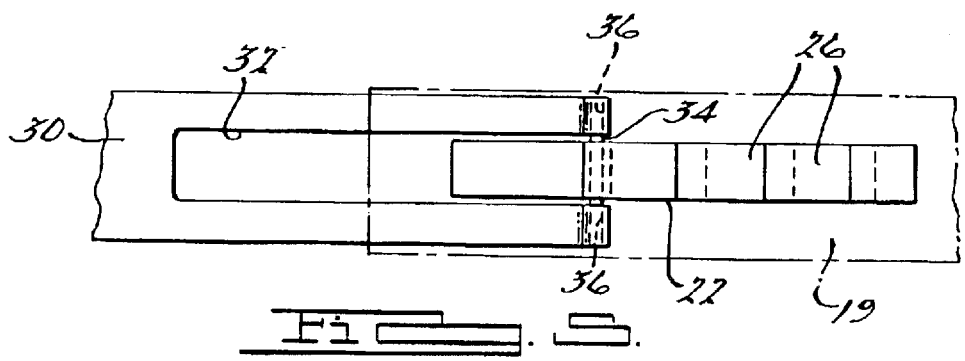
FIG. 5 is an elevational view of a portion of the cup holder assembly of FIG. 1.

Referring to the drawings and in particular FIG. 1, one embodiment of a cup holder assembly 10, according to the present invention, is shown for a vehicle 12 (partially shown). The vehicle 12 has a vehicle body 14 with an interior side 16 extending longitudinally and forming one side of an interior or occupant compartment of the vehicle 12. The vehicle 12 includes at least one cup holder assembly 10 operatively supported by the interior side 16. It should be appreciated that, except for the cup holder assembly 10, the vehicle 12 is conventional and known in the art.

Referring to FIGS. 1 through 6, the cup holder assembly 10 includes a backing plate 18 either mounted to the interior side 16 by suitable means such as fasteners (not shown) or part of the interior side 16. The backing plate 18 is generally planar and rectangular in shape. The backing plate 18 extends longitudinally. The backing plate 18 is made of a rigid material such as metal. The cup holder assembly 10 may include an interior panel 19 either mounted to the backing plate 18 by suitable means such as fasteners (not shown) or part of the interior side 16. The interior panel 19 is made of a rigid material such as plastic. It should be appreciated that the backing plate 18 and interior panel 19 may form a space or cavity 20 of the interior side 16.

The cup holder assembly 10 also includes at least one, preferably a pair of trammels 22 disposed between the backing plate 18 and the interior panel 19 and spaced longitudinally to be disposed at each longitudinal end of the cavity 20. Each of the trammels 22 is generally rectangular in shape and connected to the backing plate 18 and/or interior panel 19 by suitable means such as fasteners (not shown). Each of the trammels 22 has a bearing track 24 and at least one, preferably a plurality of recesses 26 disposed along the bearing track 24 for a function to be described. Each of the trammels 22 also has an opening 28 to allow access to the bearing track 24. The trammels 22 are made of a rigid material such as plastic. It should be appreciated that the trammels 22 may be molded as part of the interior panel 19 by suitable means such as injection molding to form a unitary and one-piece structure.

The cup holder assembly 10 includes a cup holder 30 disposed in the cavity 20 and cooperating with the trammels 22. The cup holder 30 is generally planar and rectangular in shape. The cup holder 30 is made of a flexible material such as spring steel. The cup holder 30 has a recess or cut-out 32 extending longitudinally therein at the longitudinal ends thereof to receive the trammels 22. The cut-out 32 is generally rectangular in shape to form a general "U" shape to the longitudinal ends of the cup holder 30. The cup holder 30 has a pin bearing 34 extending through apertures 36 therein across the cut-out 32 at each longitudinal end for cooperating with the trammels 22. The pin bearing 34 is generally cylindrical in shape with a generally circular cross-sectional shape. The pin bearing 34 is made of a rigid material such as metal or plastic. The cup holder 30 may include a liner 38 extending along a portion thereof for engagement with a cup or container 40. The liner 38 is made of a flexible material such as an elastomeric material. The cup holder 30 may include a pull member 42 extending along a portion thereof. The pull member 42 may have a cylindrical or planar shape to allow a person to grasp and pull on the cup holder 30. The pull member 42 is made of either a flexible material such as an elastomeric material or a rigid material such as a metal or plastic material. It should be appreciated that the liner 38 and pull member 42 are secured to the cup holder 30 by suitable means such as an adhesive or molded thereto. It should also be appreciated that the liner 38 and pull member 42 may be a single molded piece. It should further be appreciated that each of the trammels 22 has an extension 44 extending longitudinally to cooperate with the cup holder 30 to aid in flexing the cup holder 30.

The cup holder assembly 10 further includes a positioning spring 46 extending from each of the trammels 22 and into the cavity 20 for cooperating with the cup holder 30. The positioning spring 46 is generally cylindrical in shape and has one end 48 connected to the trammel 22 by suitable means such as fasteners (not shown). The positioning spring 46 is made of a spring material such as metal or plastic in a controlled "curl" shape or any suitable material capable of the same springy positioning support. It should be appreciated that the positioning springs 46 engage the cup holder 30 in a stowed position and prevent the cup holder 30 from engaging the backing plate 18.

The cup holder assembly 10 also includes a cup support 50 pivotally connected to the cup holder 30. The cup support 50 has a generally "L" shape. The cup support 50 has a first arm 52 pivotally connected to the cup holder 30 by suitable means such as a pin 54. The cup support 50 also has a second arm 56 extending generally perpendicular from the first arm 52 to engage the container 40. The cup support 50 is made of a rigid material such as plastic. It should be appreciated that the cup support 50 has a stowed and operable or drop down position to be described. It should also be appreciated that the cup support 50 is optional.

In operation of the cup holder assembly 10, the cup holder 30 is in a first or stowable position as illustrated in FIG. 1. A user such as a person (not shown) grasps the pull member 42 and pulls the cup holder 30 laterally. The user continues to pull and the pin bearings 34 are disposed in one of the recesses 26 in each of the trammels 22 until a desired opening is obtained as illustrated in FIG. 3. The cup support 50 is rotated, from a normal position identified as "A" in FIG. 6, downwardly to an operable or in use position identified as "B" in FIG. 6 only upon the user placing the container 40 in the opening to rest on the second arm 56 of the cup support 30 and held in position between the cup holder 30 and the interior panel 19. It should be appreciated that, when the cup holder 30 is collapsed and returned to residing flush with the extension 44 of the interior panel 19, the cup support 50 is rotated to a stowed away position identified as "C" in FIG. 6 by impacting the backing plate 18.

The user pulls on the pull member 42 laterally to allow the pin bearings 34 to disengage the recess 26 and the cup holder 30 is moved laterally inwardly to move the pin bearings 34 along the bearing track 24. The user continues to push the cup holder 30 laterally inwardly until the cup holder 30 engages the positioning springs 46. The user then releases the pull member 42 and the cup holder 30 is rested or maintained in the stowed position.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cup holder assembly for a vehicle comprising:
   a backing plate adapted to be operatively supported by interior structure of the vehicle;
   a plurality of trammels spaced longitudinally from each other along said backing plate, each of said trammels having a bearing track; and
   a cup holder having longitudinal ends each cooperating with one of said bearing tracks of said trammels to allow each of said longitudinal ends to be adjusted longitudinally to adjust a size of an enclosed opening formed between said cup holder and said backing plate to hold a container therein.

2. A cup holder assembly as set forth in claim 1 wherein each of said trammels has at least one recess along said bearing track.

3. A cup holder assembly as set forth in claim 2 wherein each of said trammels has an opening communicating with said bearing track to allow one of said longitudinal ends to extend therethrough and into said bearing track.

4. A cup holder assembly as set forth in claim 1 including a cup support pivotally supported by said cup holder to engage and support the container.

5. A cup holder assembly as set forth in claim 1 including a pull member extending from said cup holder to be grasped by a user.

6. A cup holder assembly as set forth in claim 1 including a liner extending along a portion of said cup holder to engage the container.

7. A cup holder assembly as set forth in claim 1 including an interior panel operatively supported by the interior structure to form a cavity with said backing plate, said cup holder closing said cavity.

8. A cup holder assembly as set forth in claim 1 wherein said cup holder is made of a flexible material.

9. A cup holder assembly for a vehicle comprising:
   a cup holder having longitudinal ends;
   a plurality of trammels operatively supported by interior structure of the vehicle and spaced longitudinally from each other for cooperating with said longitudinal ends;
   each of said trammels having a bearing track to allow each of said longitudinal ends to be adjusted longitudinally to adjust a size of an opening formed between said cup holder and the interior structure to hold a container therein;
   wherein each of said trammels has at least one recess along said bearing track; and
   wherein each of said longitudinal ends has a cut-out to receive a portion of one of said trammels.

10. A cup holder assembly as set forth in claim 9 wherein each of said longitudinal ends has a pin bearing extending across said cut-out to be disposed in either one of said bearing track and said at least one recess.

11. A cup holder assembly for a vehicle comprising:
   a cup holder having longitudinal ends;
   a cup support pivotally supported by said cup holder to engage and support the container, wherein said cup support has a general "L" shape; and a plurality of trammels operatively supported by interior structure of the vehicle and spaced longitudinally from each other for cooperating with said longitudinal ends; and each of said trammels having a bearing track to allow each of said longitudinal ends to be adjusted longitudinally to adjust a size of an opening formed between said cup holder and the interior structure to hold a container therein.

12. A cup holder assembly for a vehicle comprising:

a cup holder having longitudinal ends;

a plurality of trammels operatively supported by interior structure of the vehicle and spaced longitudinally from each other for cooperating with said longitudinal ends, each of said trammels having a bearing track to allow each of said longitudinal ends to be adjusted longitudinally to adjust a size of an opening formed between said cup holder and the interior structure to hold a container therein; and at least one positioning spring operatively positioned between said trammels to position said cup holder relative to the interior structure.

13. A cup holder assembly for a vehicle comprising:

a backing plate adapted to be operatively supported by interior structure of the vehicle;

a plurality of trammels spaced longitudinally from each other along said backing plate, each of said trammels having a bearing track, a plurality of recesses disposed along said bearing track, and an opening communicating with said bearing track; and a cup holder having longitudinal ends each extending through one of said openings and into one of said bearing tracks to allow each of said longitudinal ends to engage and disengage said recesses to adjust a size of an enclosed opening formed between said cup holder and said backing plate to hold a container therein.

14. A cup holder assembly as set forth in claim 13 including a cup support pivotally supported by said cup holder to engage and support the container.

15. A cup holder assembly for a vehicle comprising:

a cup holder having longitudinal ends;

a plurality of trammels operatively supported by interior structure of the vehicle and spaced longitudinally from each other for cooperating with said longitudinal ends;

each of said trammels having a bearing track, a plurality of recesses disposed alone said bearing track, and an opening communicating with said bearing track to allow one of said longitudinal ends to extend therethrough and into said bearing track to allow each of said longitudinal ends to engage and disengage said recesses to adjust a size of an opening formed between said cup holder and the interior structure to hold a container therein; and wherein each of said longitudinal ends has a cut-out to receive a portion of one of said trammels.

16. A cup holder assembly as set forth in claim 15 wherein each of said longitudinal ends has a pin bearing extending across said cut-out to be disposed in either one of said bearing track and said recesses.

17. A cup holder assembly as set forth in claim 13 including a pull member extending from said cup holder to be grasped by a user.

18. A cup holder assembly as set forth in claim 13 including a liner extending along a portion of said cup holder to engage the container.

19. A cup holder assembly for a vehicle comprising:

a cup holder having longitudinal ends;

a cup support pivotally supported by said cup holder to engage and support the container; wherein said cup support has a general "L" shape;

a plurality of trammels operatively supported by interior structure of the vehicle and spaced longitudinally from each other for cooperating with said longitudinal ends; and each of said trammels having a bearing track, a plurality of recesses disposed alone said bearing track, and an opening communicating with said bearing track to allow one of said longitudinal ends to extend therethrough and into said bearing track to allow each of said longitudinal ends to engage and disengage said recesses to adjust a size of an opening formed between said cup holder and the interior structure to hold a container therein.

20. A cup holder assembly for a vehicle comprising:

a cup holder having longitudinal ends;

a plurality of trammels operatively supported by interior structure of the vehicle and spaced longitudinally from each other for cooperating with said longitudinal ends, each of said trammels having a bearing track, a plurality of recesses disposed along said bearing track, and an opening communicating with said bearing track to allow one of said longitudinal ends to extend therethrough and into said bearing track to allow each of said longitudinal ends to engage and disengage said recesses to adjust a size of an opening formed between said cup holder and the interior structure to hold a container therein; and at least one positioning spring operatively positioned between said trammels to position said cup holder relative to the interior structure.

21. A cup holder assembly for a vehicle comprising:

a cup holder having longitudinal ends;

a plurality of trammels operatively supported by interior structure of the vehicle and spaced longitudinally from each other for cooperating with said longitudinal ends;

each of said longitudinal ends having a cut-out to receive a portion of one of said trammels;

each of said trammels having a bearing track, a plurality of recesses disposed along said bearing track, and an opening communicating with said bearing track to allow one of said longitudinal ends to extend therethrough and into said bearing track;

each of said longitudinal ends having a pin bearing extending across said cute out to be disposed in either one of said bearing track and said recesses to allow each of said longitudinal ends to engage and disengage said recesses to adjust a size of an opening formed between said cup holder and the interior structure to hold a container therein;

a cup support pivotally supported by said cup holder to engage and support the container; and a pull member extending from said cup holder to be grasped by a user to adjust said cup holder.

* * * * *